United States Patent
Wada et al.

(10) Patent No.: US 7,793,227 B2
(45) Date of Patent: Sep. 7, 2010

(54) METHOD AND SYSTEM OF PROVIDING CUSTOMIZABLE BUTTONS

(75) Inventors: Alan Wada, Mountain View, CA (US); Eric Burke, West Bloomfield, MI (US); Duke Tsao-Ming Fan, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 39 days.

(21) Appl. No.: 10/794,435

(22) Filed: Mar. 5, 2004

(65) Prior Publication Data

US 2005/0039144 A1 Feb. 17, 2005

Related U.S. Application Data

(60) Provisional application No. 60/494,691, filed on Aug. 12, 2003.

(51) Int. Cl.
*G06F 3/048* (2006.01)
(52) U.S. Cl. ............... 715/779; 715/780; 715/764; 715/767
(58) Field of Classification Search ............ 715/779, 715/780, 764–768, 717, 700, 709–712
See application file for complete search history.

(56) References Cited

U.S. PATENT DOCUMENTS

| | | | |
|---|---|---|---|
| 5,499,335 A | 3/1996 | Silver et al. | |
| 5,606,617 A | 2/1997 | Winburn | |
| 5,630,042 A | 5/1997 | McIntosh et al. | |
| 5,744,787 A | 4/1998 | Teicher | |
| 5,781,724 A | 7/1998 | Nevarez et al. | |
| 5,784,058 A | 7/1998 | LaStrange et al. | |
| 5,796,393 A | 8/1998 | MacNaughton et al. | |
| 5,802,530 A | 9/1998 | Van Hoff | |
| 5,805,803 A | 9/1998 | Birrell et al. | |
| 5,813,007 A | 9/1998 | Neilsen | |
| 5,848,424 A | 12/1998 | Scheinkman et al. | |
| 5,875,296 A | 2/1999 | Shi et al. | |
| 5,877,759 A | 3/1999 | Bauer | |
| 5,878,219 A | 3/1999 | Vance, Jr. et al. | |
| 5,883,810 A | 3/1999 | Franklin et al. | |
| 5,890,172 A | 3/1999 | Borman et al. | |
| 5,914,714 A * | 6/1999 | Brown | 715/866 |
| 5,917,491 A | 6/1999 | Bauersfeld | |

(Continued)

FOREIGN PATENT DOCUMENTS

WO WO 00/25239 5/2000

(Continued)

OTHER PUBLICATIONS

PCT International Search Report for PCT/US04/24397, Dated: Oct. 31, 2005.

(Continued)

*Primary Examiner*—Simon Ke
(74) *Attorney, Agent, or Firm*—James J. DeCarlo; Greenburg Traurig, LLP

(57) ABSTRACT

An embodiment of the invention provides for one or more customizable buttons, used with a downloadable toolbar for an Internet browser. The method may comprise directing an Internet browser user, using a computer, to a button modification medium, receiving modification information from the Internet browser user and loading the modified buttons on the computer.

37 Claims, 8 Drawing Sheets

U.S. PATENT DOCUMENTS

| | | | |
|---|---|---|---|
| 5,933,142 | A | 8/1999 | LaStrange et al. |
| 5,949,419 | A | 9/1999 | Domine et al. |
| 5,963,952 | A | 10/1999 | Smith |
| 5,964,836 | A | 10/1999 | Rowe |
| 5,974,446 | A | 10/1999 | Sonnenreich et al. |
| 5,999,179 | A | 12/1999 | Kekic et al. |
| 5,999,972 | A | 12/1999 | Gish |
| 5,999,973 | A | 12/1999 | Glitho et al. |
| 6,000,832 | A | 12/1999 | Franklin et al. |
| 6,006,034 | A | 12/1999 | Heath et al. |
| 6,009,459 | A | 12/1999 | Belfiore et al. |
| 6,020,884 | A | 2/2000 | MacNaughton et al. |
| 6,025,836 | A | 2/2000 | McBride |
| 6,026,435 | A | 2/2000 | Enomoto et al. |
| 6,034,683 | A | 3/2000 | Mansour et al. |
| 6,041,360 | A | 3/2000 | Himmel et al. |
| 6,057,836 | A | 5/2000 | Kavalam et al. |
| 6,061,695 | A | 5/2000 | Slivka et al. |
| 6,072,486 | A | 6/2000 | Sheldon et al. |
| 6,101,486 | A | 8/2000 | Roberts et al. |
| 6,112,240 | A | 8/2000 | Pogue et al. |
| 6,119,098 | A | 9/2000 | Guyot et al. |
| 6,125,352 | A | 9/2000 | Franklin et al. |
| 6,141,010 | A | 10/2000 | Hoyle |
| 6,175,869 | B1 | 1/2001 | Ahuja et al. |
| 6,185,600 | B1 | 2/2001 | Spence et al. |
| 6,188,995 | B1 | 2/2001 | Garst et al. |
| 6,208,995 | B1 | 3/2001 | Himmel et al. |
| 6,216,153 | B1 | 4/2001 | Vortriede |
| 6,226,655 | B1 | 5/2001 | Borman et al. |
| 6,226,752 | B1 | 5/2001 | Gupta et al. |
| 6,232,972 | B1 | 5/2001 | Arcuri et al. |
| 6,256,668 | B1 | 7/2001 | Slivka et al. |
| 6,262,731 | B1 | 7/2001 | Hasegawa |
| 6,266,058 | B1 | 7/2001 | Meyer |
| 6,266,681 | B1 | 7/2001 | Guthrie |
| 6,282,548 | B1 | 8/2001 | Burner et al. |
| 6,286,001 | B1 | 9/2001 | Walker et al. |
| 6,292,185 | B1 | 9/2001 | Ko et al. |
| 6,314,451 | B1 | 11/2001 | Landsman et al. |
| 6,360,255 | B1 | 3/2002 | McCormack et al. |
| 6,373,507 | B1 | 4/2002 | Camara et al. |
| 6,385,619 | B1 | 5/2002 | Eichstaedt et al. |
| 6,407,754 | B1 | 6/2002 | Hetherington et al. |
| 6,433,800 | B1 | 8/2002 | Holtz |
| 6,434,563 | B1 | 8/2002 | Pasquali et al. |
| 6,460,058 | B2 | 10/2002 | Kopolu et al. |
| 6,469,713 | B2 | 10/2002 | Hetherington et al. |
| 6,476,833 | B1 | 11/2002 | Moshfeghi |
| 6,483,525 | B1 * | 11/2002 | Tange ............. 715/765 |
| 6,486,892 | B1 | 11/2002 | Stern |
| 6,490,602 | B1 | 12/2002 | Kraemer |
| 6,493,000 | B1 | 12/2002 | Wynn et al. |
| 6,496,203 | B1 | 12/2002 | Beaumont et al. |
| 6,496,936 | B1 | 12/2002 | French et al. |
| 6,505,238 | B1 | 1/2003 | Tran |
| 6,542,897 | B2 | 4/2003 | Lee |
| 6,549,217 | B1 | 4/2003 | De Greef et al. |
| 6,584,505 | B1 | 6/2003 | Howard et al. |
| 6,624,831 | B1 | 9/2003 | Shahine et al. |
| 6,651,217 | B1 | 11/2003 | Kennedy et al. |
| 6,686,938 | B1 | 2/2004 | Jobs et al. |
| 6,704,031 | B1 | 3/2004 | Kimball et al. |
| 6,748,367 | B1 | 6/2004 | Lee |
| 6,789,201 | B2 | 9/2004 | Barton et al. |
| 6,819,343 | B1 * | 11/2004 | Sobeski et al. ............. 715/848 |
| 6,851,060 | B1 | 2/2005 | Shrader |
| 6,865,680 | B1 | 3/2005 | Wu et al. |
| 6,868,394 | B1 | 3/2005 | Mele |
| 6,873,974 | B1 | 3/2005 | Schutzer |
| 6,983,315 | B1 | 1/2006 | Crutcher |
| 6,986,038 | B1 | 1/2006 | Leah et al. |
| 7,027,570 | B2 * | 4/2006 | Pines et al. ............. 379/88.16 |
| 7,100,114 | B1 * | 8/2006 | Burleson ............. 715/744 |
| 7,107,548 | B2 * | 9/2006 | Shafron ............. 715/826 |
| 2001/0001147 | A1 | 5/2001 | Hutchison et al. |
| 2001/0035885 | A1 | 11/2001 | Iron et al. |
| 2002/0018078 | A1 | 2/2002 | Khan et al. |
| 2002/0057299 | A1 | 5/2002 | Oren et al. |
| 2002/0062342 | A1 | 5/2002 | Sidles |
| 2002/0069363 | A1 | 6/2002 | Winburn |
| 2002/0070963 | A1 * | 6/2002 | Odero et al. ............. 345/739 |
| 2002/0070969 | A1 | 6/2002 | Barksdale et al. |
| 2002/0075326 | A1 | 6/2002 | Allen |
| 2002/0077978 | A1 | 6/2002 | O'Leary et al. |
| 2002/0078095 | A1 | 6/2002 | Culham |
| 2002/0089549 | A1 | 7/2002 | Munro et al. |
| 2002/0097277 | A1 | 7/2002 | Pitroda |
| 2002/0149615 | A1 | 10/2002 | Rajarajan et al. |
| 2002/0149618 | A1 | 10/2002 | Estrada et al. |
| 2002/0154159 | A1 | 10/2002 | Day et al. |
| 2002/0158912 | A1 | 10/2002 | O'Rouke |
| 2002/0163544 | A1 | 11/2002 | Baker et al. |
| 2002/0163545 | A1 | 11/2002 | Hii |
| 2002/0186239 | A1 | 12/2002 | Komuro |
| 2002/0186249 | A1 | 12/2002 | Lu et al. |
| 2002/0186255 | A1 | 12/2002 | Shafron et al. |
| 2002/0186256 | A1 | 12/2002 | Hong |
| 2003/0009768 | A1 | 1/2003 | Moir |
| 2003/0011641 | A1 | 1/2003 | Totman et al. |
| 2003/0028764 | A1 | 2/2003 | Campbell |
| 2003/0067481 | A1 | 4/2003 | Chedgey et al. |
| 2003/0080995 | A1 | 5/2003 | Tenenbaum et al. |
| 2003/0085916 | A1 | 5/2003 | Thiry et al. |
| 2003/0085927 | A1 | 5/2003 | Muller |
| 2003/0112271 | A1 | 6/2003 | Batalden et al. |
| 2003/0112280 | A1 | 6/2003 | Driskell |
| 2003/0128233 | A1 | 7/2003 | Kasriel |
| 2003/0131106 | A1 * | 7/2003 | Kasriel ............. 709/225 |
| 2003/0202009 | A1 | 10/2003 | Kasriel |
| 2004/0061720 | A1 * | 4/2004 | Weber ............. 345/760 |
| 2004/0125130 | A1 | 7/2004 | Flamini et al. |
| 2004/0174396 | A1 | 9/2004 | Jobs et al. |
| 2004/0186775 | A1 | 9/2004 | Margiloff et al. |
| 2004/0243520 | A1 | 12/2004 | Bishop et al. |
| 2005/0039141 | A1 | 2/2005 | Burke et al. |
| 2005/0050547 | A1 | 3/2005 | Whittle et al. |
| 2005/0198220 | A1 | 9/2005 | Wada et al. |
| 2006/0136843 | A1 * | 6/2006 | Shafron ............. 715/826 |

FOREIGN PATENT DOCUMENTS

| | | |
|---|---|---|
| WO | WO 00/31657 A2 | 6/2000 |
| WO | WO 01/39046 A1 | 5/2001 |
| WO | WO 01/67285 A2 | 9/2001 |
| WO | WO 01/95104 | 12/2001 |
| WO | WO 03 038554 | 5/2003 |
| WO | WO 03/038640 | 5/2003 |
| WO | WO 2005/017670 A2 | 2/2005 |
| WO | WO 2005/019983 A2 | 3/2005 |
| WO | WO 2005/043355 A2 | 5/2005 |

OTHER PUBLICATIONS

PCT Written Opinion for PCT/US04/24397, Dated: Oct. 31, 2005.
"Band Objects", Microsoft Corporation, Copyright 1997.
"Browser Extensions", MSDN, Copyright 2004, http://msdn.microsoft.com/library/default.asp?url=/workshop/browser/ext/overview/overview.asp.
"Creating Custom Explorer Bars, Tool Bands, and Desk Bands", MSDN, Copyright 2004, http://msdn.microsoft.com/library/default.asp?url=/library/en-us/shellcc/platform/Shell/programmersguide/shell_adv/bands.asp.
"Developers Get Early IE 5", Wired News, Jun. 11, 1998, http://www.wired.com/news/print/0,1294,12936,00.html.

"Introduction", XUL Programmer's Reference Manual, Last Updated: Apr. 5, 2001, http://www.mozilla.org/xpfe/xulref/.

"Netscape 6 Preview Release 1", NT Compatible, Apr. 5, 2000, http://www.ntcompatible.com/story322.html.

"Plug-in Guide", DevEdge Online Documentation, Jan. 1998, Chapter 1, http://developer.netscape.com/docs/manuals/communicator/plugin/index.htm.

"Subject: Add toolbar to IE4-taskbar", Google Groups, Jan. 26, 1999, http://groups.google.com/groups?hl=en&lr=&ie=UTF-8& oe=UTF-8&threadm=36ae2a57.3471779%40news.uni-stuttgart.de&rnum=9&prev=/groups%3Fhl%3Den%26lr%3D%26ie%3DUTF-8%26oe%3DUTF-8%26q%3Dtoolbar%2Bin%2Bie4.

"Subject: Adding Toolbar (Plugin) in Netscape Communicator", Google Groups, May 18, 2000, http://groups.google.com/groups?hl=en&lr=&ie=UTF-8&oe=UTF-8 &threadm=8gp8t5%241ab1%40secnews.netscape.com&rnum=23 &prev=/groups%3Fq%3Dcustom%2Btoolbars%2Bin%2Bnetscape%2B6%26start%3D20%26hl%3Den%26lr%3D%26ie%3DUTF-8%26oe%3DUTF-8%26selm%3D8gp8t5%25241ab1%2540secnews.netscape.com%26rnum%3D23.

"Subject: Custom Toolbar for Netscape Browser", Google Groups, May 15, 2001, http://groups.google.com/groups?hl=en& lr=& ie=UTF-8&oe=UTF-8&threadm=3B0177FD.BE89042B%40univ.ox.ac.uk&rnum=2&prev=/groups%3Fhl%3Den%26lr%3D%26ie%3DUTF-8%26oe%3DUTF-8%26q%3Dcustom%2Bnetscape%2B6%2Btoolbar%2B-button%2B-personal.

"Subject: How the Hell ????", Google Groups, Jun. 6, 2000, http://groups.google.com/groups?hl=en&lr=&ie=UTF-8&oe=UTF-8& threadm=8hln7u%24fb53%40secnews.netscape.com&rnum=11& prev=/groups%3Fq%3Dadding%2Btoolbars%2Bin%2Bnetscape%2B6%26start%3D10%26hl%3Den%26lr%3D%26ie%3DUTF-8%26oe%3DUTF-8%26selm%3D8hln7u%2524fb53%2540secnews.netscape.com%26rnum%3D11.

"Subject: How to add toolbar like Yahoo companion in IE", Google Groups, Sep. 30, 1999, Messages 1-10, http://groups.google.com/groups?hl=en&lr=&ie=UTF-8&oe=UTF-8&threadm=OWlmH%246C%24GA.227%40cppssbbsa02.microsoft.com &rnum=88&prev=/groups%3Fq%3Dtoolbar%2Bin%2Bie4%26hl%3Den%26lr%3D%26ie%3DUTF-8%26oe%3DUTF-8%26start%3D80%26sa%3DN.

"Subject: How to add toolbar like Yahoo companion in IE", Google Groups, Sep. 30, 1999, Messages 11-14, http://groups.google.com/groups?hl=en&lr=&ie=UTF-8&oe=UTF-8& threadm=7tdbfa%247j9%241%40nnrp1.deja.com&rnum=2& prev=/groups%3Fhl%3Den%26ie%3DUTF-8%26oe%3DUTF-8%26q%3Dtoll%2Bband%2Bin%2Bie4%26spell%3D1.

"Subject: IE4 Band Objects", Google Groups, Mar. 22, 1998, http://groups.google.com/groups?hl=en&lr=&ie=UTF-8&oe=UTF-8 &threadm=3524f417.0%40news1.cityweb.de&rnum=1&prev=/groups%3Fhl%3Den%26lr%3D%26ie%3DUTF-8%26oe%3DUTF-8%26q%3D%2522communication%2Bbands%2522%2Bie4.

"Subject: Plugins for IE", Google Groups, Sep. 30, 2000, http://groups.google.com/groups?hl=en&lr=&ie=UTF-8&oe=UTF-8 &threadm=Ojkp2jxLAHA.243%40cppssbbsa04&rnum=24 &prev=/groups%3Fq%3Dplugin%2Bgroup:microsoft.public.inetexplorer.ie4.activex_contrl%26hl%3Den%26lr%3D%26ie%3DUTF-8%26oe%3DUTF-8%26group%3Dmicrosoft.public.inetexplorer.ie4.activex_contrl%26start%3D20%26sa%3DN.

"Subject: Toolbar like IE4", Google Groups, Apr. 23, 1998, http://groups.google.com/groups?hl=en&lr=&ie=UTF-8&oe=UTF-8 &threadm=eyzHG4qb9GA.136%40uppssnewspub05.moswest.msn.net&rnum=6&prev=/groups%3Fhl%3Den%26lr%3D%26ie%3DUTF-8%26oe%3DUTF-8%26q%3Dtoolbar%2Bin%2Bie4.

"Subject: Whats the deal with Yahoo Companion? Standard plugin API or not?", Google Groups, Jan. 12, 2000, http://groups.google.com/groups?hl=en&lr=&ie=UTF-8&oe=UTF-8& threadm=387D225C.E3796E7C%40sympatico.ca&rnum=2& prev=/groups%3Fhl%3Den%26lr%3D%26ie%3DUTF-8%26oe%3DUTF-8%26q%3Dcustom%2Btoolbar%26btnG%3DGoogle%2BSearch%26meta%3Dgroup%253Dnetscape.devs-plugins.

Berst, Jesse, "A Must-See Browser Add-On," ZDNet AncorDesk. Sep. 16, 1998. http://www.zdnet.com/anchordesk/story/story_2543.html.

Lash, Alex, "Alexa Accessorizes Browsers," CNET News.com. Sep. 22, 1997. http://news.com.com/2100-1001-203484.html.

Eisenberg, Bart, "Alexa Archives the Internet," Copyright 1997. http://www.gihyo.co.jp/magazine/SD/pacific/SD_9711.html.

"As Go Surfers, So Goes Alexa". Wired News. Jul. 24, 1997. http://www.wired.com/news/technology/0,1282,5427,00.html.

"Client/Server and Host Application Development Tools", DBMS, v9, n6, p. 27(10), Jun. 15, 1996.

Alexa Internet Website. Archived Feb. 9, 1998 at http://web.archive.org.

Alwang, Greg, "Meeting of the Minds", PC Magazine, v17, n4, p. 179(10), Feb. 24, 1998.

Childers, Mark, "Delphi Client/Server Suite", PC Magazine, v15, n1, p. 207(3), Sep. 10, 1996.

Evans, Nick, "Extend Client/Server Apps to the Web", Data Based Advisor, v15, n3, p. 52(5), Mar. 1997.

Faison, "The New HTML Help System Extends Online Help From the Desktop to the Web", Microsoft Systems Journal, v13, n1, p. 55(14), Jan. 1998.

Finn, Mike, "Add Control to your Intranet", Databased Web Advisor, v15, n8, p. 56(3), Aug. 1997.

Flanagan, David, "Netscape 6.0 Released", O'Reilly, Nov. 16, 2000, http://www.oreillynet.com/pub/a/oreilly/news/flanagan3_1100.html.

Galli, Marcio, "The DevEdge RSS-News Ticker Toolbar", Netscape DevEdge, Jul. 14, 2003, http://devedge.netscape.com/viewsource/2003/rss-toolbar-ticker/.

International Preliminary Examination Report for International Application No. PCT/US01/16993, Mar. 5, 2003.

International Preliminary Examination Report for International Application No. PCT/US99/25332, Jul. 29, 2002.

International Search Report for International Application No. PCT/US01/16993, Oct. 25, 2001.

International Search Report for International Application No. PCT/US02/34509, Oct. 28, 2003.

International Search Report for International Application No. PCT/US02/34510, Jan. 31, 2003.

International Search Report for International Application No. PCT/US99/25332, Feb. 2, 2000.

Written Opinion for International Application No. PCT/US02/34510, Sep. 26, 2003.

Jimmy, "Netscape 6.0 Preview Release 2 Review—Good Software, Bad Timing", Jimmy's World, Aug. 9, 2000, http://www.jimmysworld.org/opinions/netscape-6.0-pr2.html.

Mace, Thomas, "PowerBrowser", PC Magazine, vol. 15, No. 5, p. 132(1), Mar. 12, 1996.

Mann, Alex and Hecht Kevin, "DevEdge Newsgroup FAQ: Client Technical", DevEdge Online Archive, Last Updated: Dec. 15, 1998, http://developer.netscape.com/support/faqs/champions/client_tech.html.

Mendelson, Edward, "Wake Up Your Web Site", PC Magazine, vol. 17, No. 11, p. 60(2), Jun. 9, 1998.

Persky, James, "HTML goes WYSIWYG: Two Mac-based Editors", LAN Magazine, v12, n3, p. 121(5), Mar. 1997.

Roberts, Scott, "Programming Microsoft Internet Explorer 5", Jul. 1999, pp. 3-16, 383-423, 461-475, Microsoft Press, USA.

Summers, Jason, "Plug-ins Newsgroup FAQ: Plug-ins", DevEdge Online Archive, Last Updated: May 26, 1999, http://developer.netscape.com/support/faqs/plugins/general.html.

Trupin, Joshua, "The Visual Programmer puts Active X Document Objects Through Their Paces", Microsoft Systems Journal, v11, n6,. p. 55(16), Jun. 1996.

Ladd, Eric and O'Donnell, Jim, "Using Microsoft Internet Explorer 4," Que Corporation. 1997. pp. 42 and 43.

Walter, Mark, "Acrobat 4: Adobe's Bid to Make it More than Just a Viewer", Seybold Report on Internet Publishing, 3, 7, NA(1), Mar. 1999.

Wong, William, "Meeting on the Internet in 10 Minutes", Network, v12, n12, p. 131(4), Nov. 1997.

Alexa, Alexa Toolbar Version 1.4.1, Copyright 1998, [Note: Setup File Available on Enclosed CD in Folder Entitled "Alexa Setup," also available at http://ftp3.ru.freebsd.org/pub/pc/windows/WinSock/IE/ at hyperlink alexaSetup14m.exe.

International Preliminary Examination Report for International Application No. PCT/US02/34509; May 11, 2004.

International Preliminary Examination Report for International Application No. PCT/US02/34510; Aug. 12, 2004.

International Search Report for International Application No. PCT/US04/24397; Oct. 31, 2005.

Written Opinion for International Application No. PCT/US04/24397; Oct. 31, 2005.

International Preliminary Report on Patentability for International Application No. PCT/US2004/024397; Feb. 13, 2006.

Hauser, "Generic Extensions of WWW Browsers", First USENIX Workshop on Electronic Commerce; Aug. 10, 1995; pp. 147-154.

* cited by examiner

METHOD AND SYSTEM OF PROVIDING CUSTOMIZABLE BUTTONS

CROSS-REFERENCE TO RELATED APPLICATION

This application claims the benefit of U.S. Provisional Application Ser. No. 60/494,691, filed Aug. 12, 2003, entitled METHOD AND SYSTEM OF PROVIDING CUSTOMIZABLE BUTTONS, which is hereby incorporated herein by reference.

BACKGROUND OF THE INVENTION

1. Field of the Invention

The present invention is directed to computer interfaces and, more particularly, to a method and system of providing customizable buttons.

2. Description of Related Art

When accessing the Internet and the World Wide Web, an Internet user typically executes, via a computer, a browser software program such as, for example, Netscape Navigator™ or Microsoft Internet Explorer™. The browser program (i.e., a browser) establishes a link to the Internet (via a modem and an Internet Service Provider (ISP), for example) and also provides a textual and graphical user interface (e.g., an application window), and included in the application window, a window for displaying Internet content (e.g., a browser window) and toolbars for interfacing with the browser.

The toolbars allow a user to interface with the browser. Toolbars can include textual regions, graphical regions, or a combination of both textual and graphical regions. Selecting an item on a toolbar can instruct the browser to perform a certain function, or such selection may open a menu of items from which a user can choose a plurality of items. Other browser toolbars allow a user to enter an Internet address and instruct the browser to navigate to that address. Some of the browser function that can be implemented include, for example, save, forward, back, stop and refresh.

Browsers typically include functionality that allows a user to make certain modifications to the appearance and/or functionality of, or otherwise customize, the application window. For example a user can add additional toolbars, hide toolbars, change the size of the toolbar icons and add additional items to a toolbar.

A deficiency with present browser systems, however, is that the browser settings, once set, are the same for each user who uses a computer. Another deficiency with present browser systems is that the settings are limited to the computer where the modifications were implemented. Accordingly, a need exists for an improved method and system for providing customizable buttons for a browser.

SUMMARY OF THE INVENTION

The invention satisfies these and other needs, which will be apparent from the teachings herein. An embodiment of the invention includes providing one or more customizable buttons, used with a downloadable toolbar for an Internet browser. The method can comprise directing an Internet browser user, using a computer, to a button modification medium, receiving modification information from the Internet browser user and loading the modified buttons on the computer. In certain embodiments, information related to the customizable buttons is stored at a remote server such that a user may implement and/or modify certain parameters regarding the customizable buttons on a first computer, and then have access to the buttons while using a second computer.

Other objects and features of the present invention will become apparent from the following detailed description, considered in conjunction with the accompanying drawing figures. It is understood, however, that the drawings are designed solely for the purpose of illustration and not as a definition of the limits of the invention, for which reference should be made to the appended claims.

BRIEF DESCRIPTION OF THE DRAWING FIGURES

In the drawing figures, which are not to scale, and which are merely illustrative, and wherein like reference numerals depict like elements throughout the several views.

DETAILED DESCRIPTION OF EXEMPLARY EMBODIMENTS

There will now be shown and described in connection with the attached drawing figures several exemplary embodiments of a system and method of providing customizable buttons.

Figure 1:
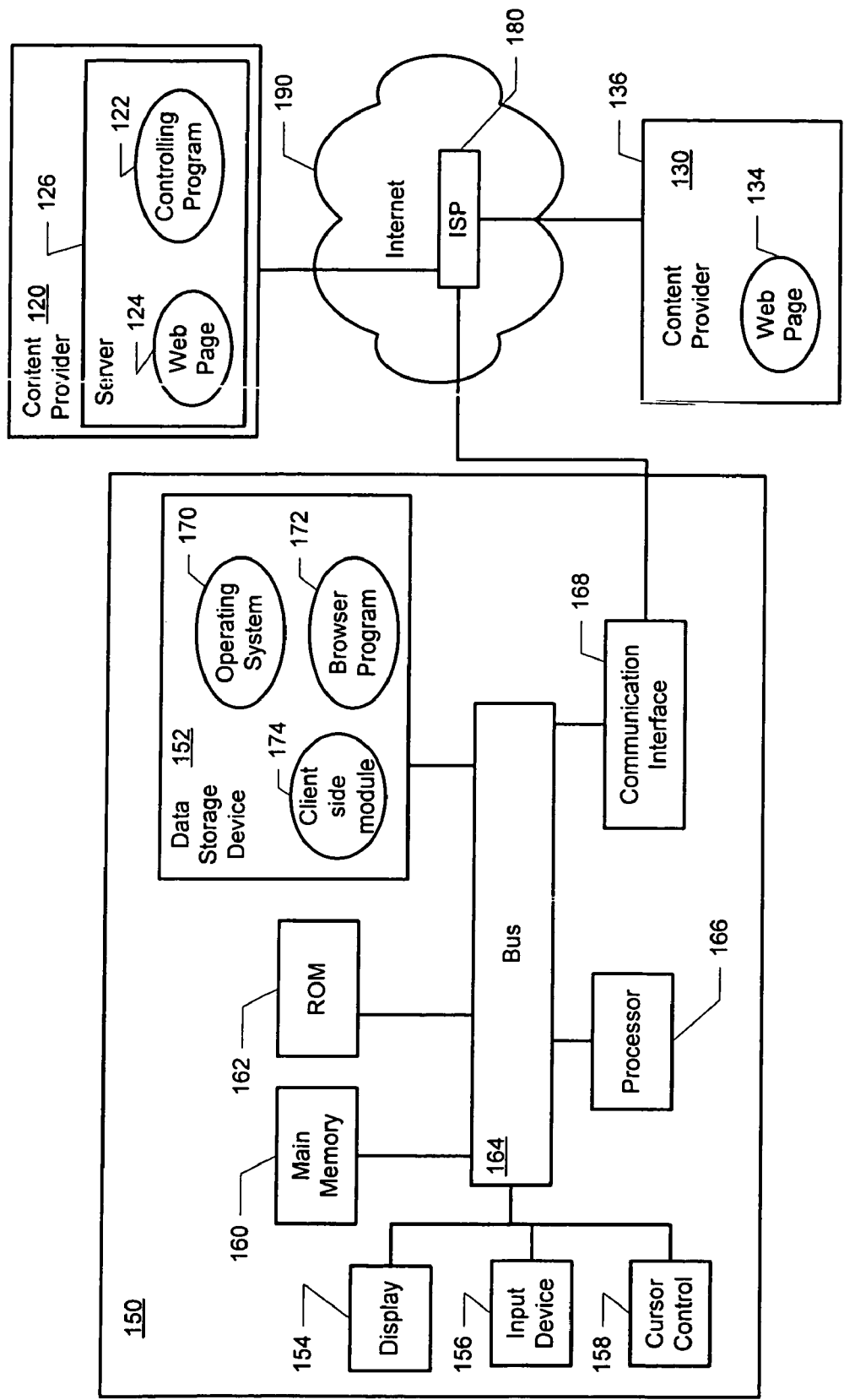
FIG. 1 is a schematic illustrating an exemplary system implemented according to an embodiment of the invention.

With reference to FIG. 1, there is shown an exemplary block diagram of a system 100 implemented in accordance with certain embodiments of the invention. A computer 150 is connected to the Internet 190. Computer 150 includes an internal bus 164 that facilitates communication of information (i.e., digital data) between and among the various devices of the computer 150 and that also facilitates communication between the computer and external devices and systems via a communication interface 168. A processor 166 coupled to the bus 164 processes information within the computer 150. The computer 150 also includes a memory 160 such as, for example, Random Access Memory (RAM) and/or other equivalent dynamic memory storage devices, coupled to bus 164 for receiving and storing instructions communicated from the processor 166. Memory 160 may also be used to temporarily store variable or other intermediate information while the processor 166 executes instructions. Read-Only-Memory (ROM) 162 is also coupled to the bus 164 for storing static data and instructions for use by the processor 166.

Various input and output devices are provided as part of computer 150, including, by way of non-limiting example, a display 154 (e.g., cathode ray tube (CRT), liquid crystal display (LCD), etc.), an input device 156 such as a keyboard, and a cursor control device 158 such as a mouse, or trackball, for example. A data storage device 152 such as, for example, a magnetic disk drive and magnetic disk, a CD-ROM drive and CD-ROM, or other equivalent devices and data storage mediums, is coupled to the bus 164 for communication with the processor 166, main memory 160, and communication interface 168. The storage device 152 preferably has an operating system 170 and an Internet browser software program 172 (i.e., a browser) stored thereon. As will be discussed in greater detail below, a client-side module 174 may also be stored on the data storage device 152.

The computer 150 may communicatively connect to the Internet 190 via the communication interface 168 over one or more transmission media including, but not limited to, coaxial cable, copper wires, and fiber optical cables. Communication between the computer 150 and the Internet 190 may also be via a wireless or cellular interface. The communication interface 168 facilitates two-way communication between the computer 150 and another electronic device or system, e.g., a server computer or computers 126 provided by a content provider 120, 130.

An Internet user (not shown) using the computer 150 may gain access to the Internet 190 by causing the browser 172 to execute, thereby opening a communication link between the communication interface 168 of the computer 150 and an Internet site 126 of content provider 120, via an Internet Service Provider (ISP) 180. Internet content is communicated by the content provider 120 to the computer 150 for display by browser 172. Alternatively, a content provider 120, 130 may also be an ISP 180.

In alternative embodiments, computer 150 may be a desktop or notebook computer, PDA, hand held device, or wireless phone (with graphics capability), or any other device now known or hereafter developed that is capable of performing the functions as described herein.

In accordance with an embodiment of the invention, a first Internet content provider 120 may provide an Internet user with access to a program 122 for controlling the browser 172. When executed by the user, the controlling program 122 downloads or creates a client-side module 174 such as, for example, a Dynamic Link Library (DLL), on the data storage device 152 of the Internet user's computer 150. The client-side module 174 preferably includes ActiveX control or Plug-in functionality. Thereafter, when the Internet user accesses the Internet using the browser 172, the browser 172 opens the client-side module 174 and preferably automatically establishes a connection to the content provider's Internet site 126. The content provider, in response to the connection established by the browser 172, loads information and/or functional data into a shell operating within the browser and created by the client-side module 174. For example, if the user has an account with the content provider 120, customized information and/or functionality may be loaded into the client-side module 174. If the user does not have an account, more generalized (e.g., guest) information and/or functionality may be loaded.

The client-side module 174 essentially opens a shell (or a plurality of shells) within the browser 172 that contains the ActiveX control or Plug-in code that may control, i.e., add, remove, and/or modify, the Internet browser 172. When loaded with the ActiveX control or Plug-in, the client-side module 174 preferably contains functions, objects, data, and other software, referred to generally herein as information, that may be used to control the browser 172. The present invention ensures that the client-side module 174 (and shell) does not close when the Internet user moves, for example, from Internet site 126 (having a Web page 124) to Internet site 136 (having Web page 134). Thus, the information and/or functionality provided via the ActiveX control or Plug-in is not lost when the Internet user disconnects from the Internet site that loaded the ActiveX control or Plug-in, and connects to another Internet site. In alternate embodiments client-side module 174 may be located at a remote location from the Internet user.

An embodiment of the invention may be provided as a feature of a method of controlling an Internet browser interface displayable by an Internet browser on a display of a computer, and enabling a user of the computer and Internet browser to access and navigate the Internet and to receive and display on the computer display one or more Web pages from one or more Internet sites, including the display of a Web page from a predetermined Internet site, the Internet browser having at least one Internet browser toolbar having at least one toolbar button providing a predetermined functionality to the user of the computer and Internet browser, the method can comprise providing, at the predetermined Internet site, access to a program for controlling the Internet browser interface and making available for downloading by the predetermined Internet site, a file for causing the display of a persistent user toolbar adjacent to said Internet browser toolbar so as to create the visual impression that the user toolbar is an integrated part of the Internet browser, the user toolbar making additional functionality that is not part of the Internet browser prior to download available to the user after download as part of the Internet browser interface, such that once the user toolbar is displayed the user toolbar remains displayed and said additional functionality remains available to the user regardless of a subsequent Internet site to which the Internet browser is caused to navigate after download. Such a method is described in further detail in U.S. patent application Ser. No. 09/429,585, filed Oct. 28, 1999, and entitled "A Method Of Controlling An Internet Browser Interface And A Controllable Browser Interface," the contents of which are hereby incorporated by reference herein.

The method of controlling a browser may be implemented using, by way of non-limiting example, a downloadable toolbar. An Internet user may customize the browser so that each time the user accesses the Internet using the browser, user-defined information and/or functionality, e.g., a customizable button on a toolbar, will be displayed with the browser interface. In addition, the toolbar may also include bookmarks, address and phone books, personal financial information, personalized news, and/or various functionality such as is available via ActiveX control and Plug-ins. The customizable button acts like a typical toolbar button, except an Internet user can edit the title, the Uniform Resource Identifier (URI), and displayed icon related to the button. In some embodiments, the quantity of customizable buttons a user can have may be limited, e.g., limited to 2 buttons, by the content provider 120. When the toolbar is executed, the client-side module 174 can receive some, none or all of the toolbar buttons from a content provider 120. The toolbar buttons and their characteristics may be obtained through a feed from the content provider 120 to the client computer 150.

In addition, if an Internet user has an account with a content provider 120, that user's specific account information (e.g., investment portfolio, news headlines, bookmarks, address book, customized button etc.) may be saved by the content provider 120 and dynamically displayed by different browsers on different computers. Also, two or more Internet users who share the same computer, but have different user accounts with a content provider 120 can each load their own account information, e.g., their personal customizable button or buttons, so that each user's personal buttons are displayed when that user logs into his or her respective account.

Figure 2:
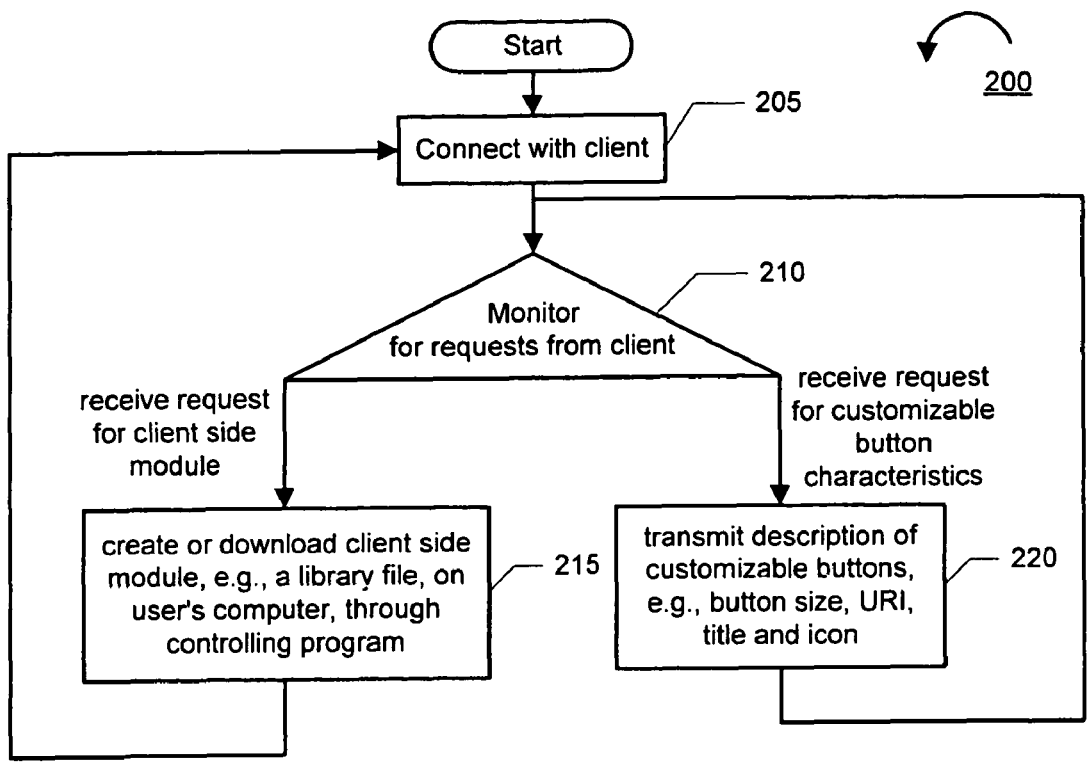
FIG. 2 is a flowchart illustrating an exemplary process of providing customizable buttons according to an embodiment of the invention.

FIG. 2 illustrates an exemplary embodiment of a method 200 for providing computer code for providing customizable buttons. In an embodiment of the invention, a user desiring customizable buttons would receive, e.g., download, the client side module 174 from a content provider 120. Therefore, processing of method 200 begins in step 205 with the content provider 120 connecting with a client computer 150. Content provider 120 may connect with client computers through a server 126. The server 126 may then provide the client 150 with, e.g., a web page, including a number of different options such as creating a new account, signing into an existing account, and downloading a client side module 174.

Processing proceeds from step 205 to step 210, where the server 126 monitors for requests from the client 150. When a request for a client-side module 174 is received, processing proceeds from step 210 to step 215. In step 215, through the controlling program 122, the server 126 creates or downloads a client-side module 174, to the user's computer 150. The client-side module 174 may be, for example, a library file.

Once the client-side module 174 is obtained by the client 150, and the client-side module 174 is executed, e.g., in response to the user executing a browser application, in an embodiment of the invention, the client-side module 174 automatically (or otherwise) connects with a content provider 120. Thus, method 200 proceeds from step 215 to step 205 where the content provider 120 connects with the client 150. The content provider can be content provider 120, from which client-side module 174 is downloaded, or alternatively, the content provider can be another site, e.g., content provider 130.

Processing proceeds from step 205 to step 210 where the server 126 monitors for requests from the client 150. When a request for customizable button characteristics is received, processing proceeds from step 210 to step 220, where the server 126 transmits the characteristics of the customizable button to the client 150. The request for customizable buttons may be part of a request for the contents of a downloadable toolbar. The request may be an explicit request for customizable button characteristics and/or a content provider may automatically send customizable button characteristics in response to a general request for toolbar content. In an embodiment of the invention, before the request for customizable button characteristics is received by the server 126, the user at client 150 would sign into or open a new account with the content provider 120. In that embodiment, no customizable button is displayed until the user signs into an account.

Having an account with the content provider 120 and allowing the content provider 120 to store button characteristics allows multiple users who use the same computer to each have their own button characteristics when using the same computer. Another benefit of certain embodiments is that the same user can use his or her personalized button characteristics at different computers without having to re-set those characteristics at the different computers. Alternatively, if the client does not have an account with the content provider 120 or the client is not signed in, the content provider 120 may transmit standard or generic button characteristics. Following step 220, processing returns to step 210, where the server 126 monitors for requests from the client 150.

Figure 4:
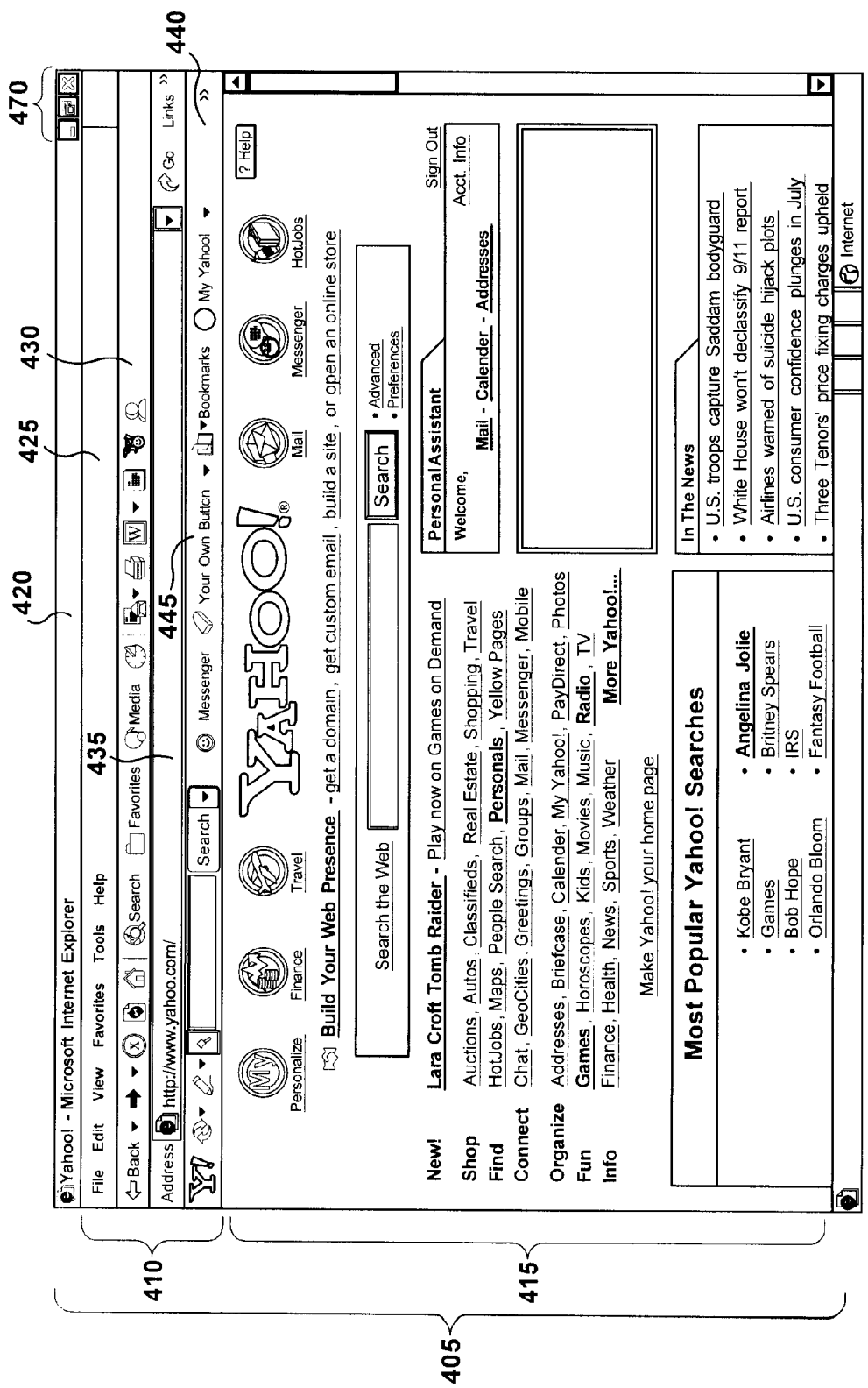
FIG. 4 is an exemplary screen shot illustrating an exemplary customizable button according to an embodiment of the invention.

FIG. 4 is an exemplary screen shot illustrating a browser 400 implemented according to an embodiment of the invention. Browser 400 includes a plurality of windows that provide various functionalities to an Internet user. The browser 400 may comprise a first application window 405 that typically defines the general size, color, and layout of the browser 400 and includes window control buttons 470 (e.g., minimize, close, etc.) for that application window 405. The browser 400 may also comprise a browser window 415 and toolbar windows 410. The browser window 415 and the toolbar windows 410 typically define information and/or functionality that will assist an Internet user when accessing and navigating the Internet. For example, the browser window 415 and the toolbar windows 410 may provide toolbars, pull-down menus, Plug-ins, applications, etc. A browser window 415 is provided as part of the browser 400 within which content from an Internet content provider 120 (see FIG. 1) may be displayed.

Toolbar windows 410 provided at the top (see FIG. 4) of the application window 405 define four toolbars 425, 430, 435, 440, which may include a variety of interface controls such as, for example, pull-down menus, functional buttons (e.g., stop, back, forward, home, etc.), and a combination of functional buttons and windows (e.g., a search button and window). The upper most toolbar 425 provides a plurality of pull-down menus; the second toolbar from the top 430 provides a plurality of functional buttons; the third toolbar from the top 435 provides a pull-down menu and a window, e.g., a URI address window; the bottom most toolbar 440 is executed by the client-side module 174 and provides added functionality to the browser such as a search field and a customizable button, e.g. button 445.

Figure 5:
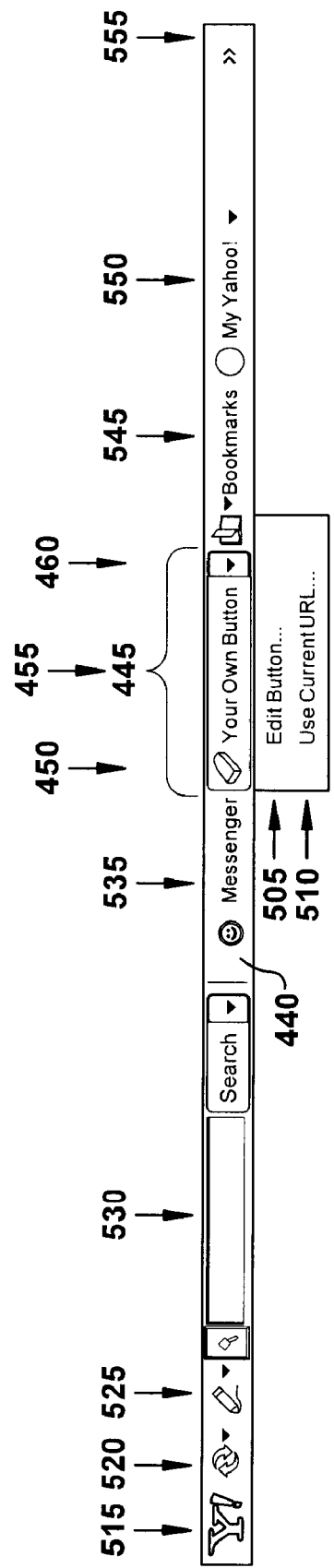
FIG. 5 is an exemplary screen shot illustrating options for modifying the customizable button according to an embodiment of the invention.

FIG. 5 is a screenshot illustrating an embodiment of the bottom most toolbar 440. Toolbar 440 includes a shortcut button to a content provider 515, e.g., www.yahoo.com, a toolbar selection button 520, a toolbar settings button 525, a search field 530, a shortcut button to a messaging service 535, a customizable button 445, a bookmarks button 545, a shortcut button to a customizable webpage 550, and a button 555 that creates a drop down menu including more toolbar items for an Internet user. These additional items may include a shortcut to email and shopping (not shown). Customizable button 445 includes an icon 450, a button title 455, and a drop down menu button 460.

The customizable button 445 can be setup by an Internet user, so that when the user selects the button 445, the browser navigates to a predetermined Internet site. A user can also customize the button's title and the icon related to the button. Customization is done through the content provider 120 and can be accessed through drop down menu button 460. When the drop down menu button 460 of the customizable button 445 is selected, a drop down menu including two items, "Edit Button . . . " 505, and "Use Current URL . . . " 510 appears. A Uniform Resource Locator (URL), is one type of URI. These items can be selected by an Internet user to modify their customizable button characteristics. In other embodiments, a user can modify the contents of the drop down menu to include additional items. The additional items perform user-defined functions and/or may also form submenus including more items. A user can organize personalized menu items and submenus with a content provider 120, by using a folder system.

Figure 3:
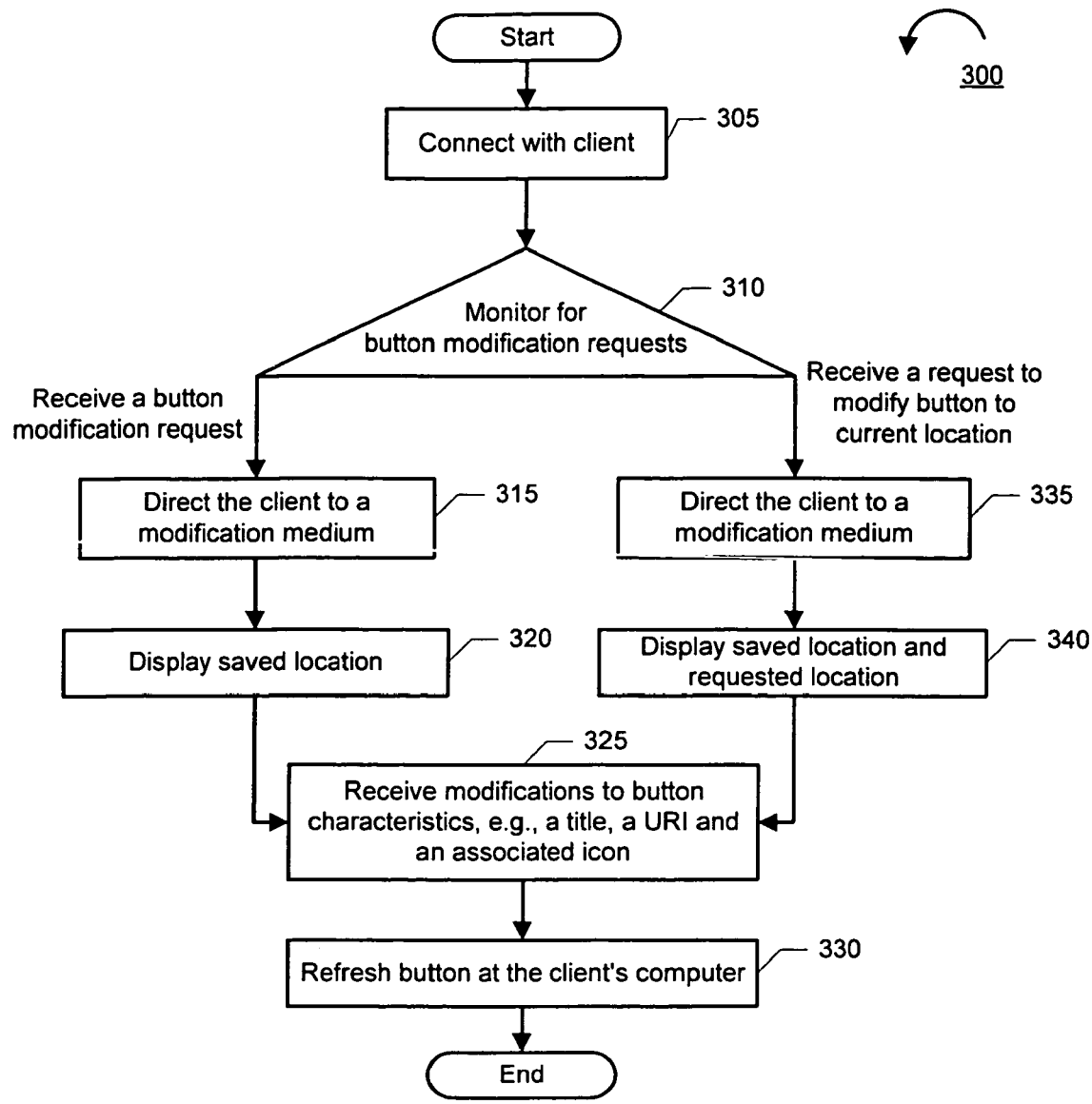
FIG. 3 is a flowchart illustrating an exemplary process of modifying customizable buttons according to an embodiment of the invention.

FIG. 3 illustrates an exemplary embodiment of a method 300 for modifying the customizable buttons of an embodiment of the invention. In this embodiment the customizable button 445 is part of a downloadable toolbar 440 for a browser 400. The customizable button 445 can be setup by an Internet user, so that when the user selects the button, the browser navigates to a predetermined Internet site. Since the button characteristics are stored by the content provider 120, when a user wants to modify their button characteristics, they connect with the content provider 120. Therefore, the method 300 starts in step 305, with the server 126 connecting with a client computer 150. Processing proceeds from step 305 to step 310, where the server 126 monitors for button modification requests.

In an embodiment of the invention, button modification requests can be received in a plurality of ways. First, an Internet user can perform a standard button modification. For example, when an Internet user selects "Edit Button . . . " 505 (See FIG. 5), server 126 receives a button modification request and processing proceeds from step 310 to step 315. In step 315 the server 126 directs the client 150 to a modification medium, e.g. a web page, and in step 320, the server 126 displays the address of the current Internet site associated with the customizable button. If a user has not associated a customizable button with an Internet site, the content provider 120 can set the button to a default location.

Figure 6:
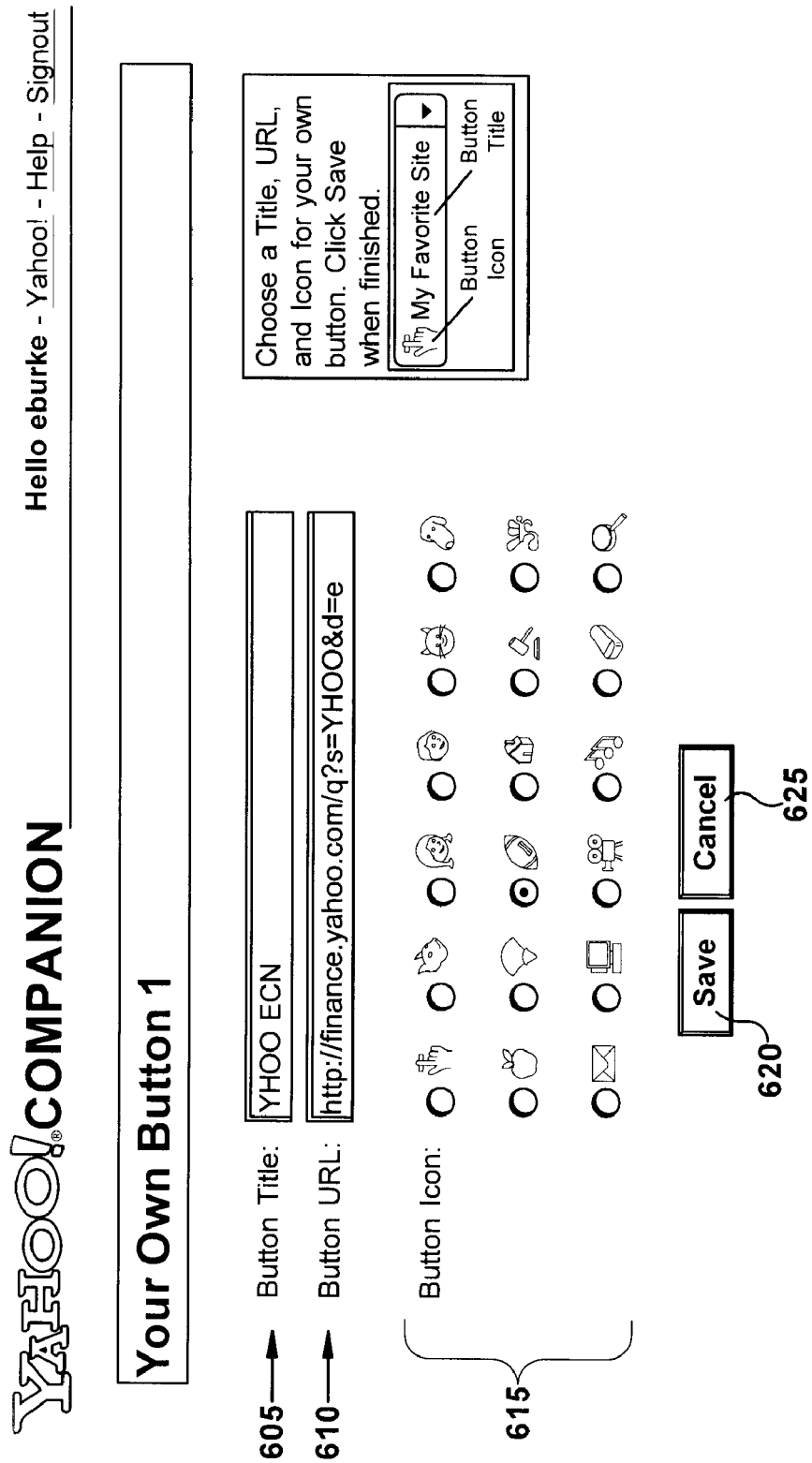
FIG. 6 is an exemplary screen shot illustrating a modification interface according to an embodiment of the invention.

In an embodiment of the invention, a user may be directed to the webpage 600, illustrated in FIG. 6, after selecting "Edit Button . . . " 505. The webpage 600 includes a customizable button title interface 605, a URI associated with the customizable button interface 610, and a plurality of selectable icons 615. The title of the button can be modified by the user by entering a title into interface 605. In the present example the user has decided to name his button "YHOO ECN."

The URI associated with the button can be modified using interface 610. In the present example the user has decided to associate his or her button with "http://finance.yahoo.com/q?s=YHOO&d=e." In an embodiment, for security reasons, URIs that start with anything other than "http://" or "https://" or "ftp://" are automatically prefixed with "http://". In other embodiments different URIs including "about://", "javascript://", "file://", etc. may be associated with the customizable button.

The icon that will be displayed with the customizable button is selected from a plurality of icons 615. In the present example the user has chosen the football icon. In certain embodiments, an Internet user is prevented from uploading third party icons. One benefit of preventing such uploading is the removal of the use of such icons, and the possibility that such icons may not scale well (i.e., the proportions of the bitmap or other image to be used as an icon may not match the preferred or implemented proportions for proper display) and/or may violate copyrights if a user uploads an image that the user is not entitled to use. In other embodiments, safeguards may be implemented to automatically scale an uploaded icon to the correct size and/or block copyrighted images. In an alternative embodiment, the upload of any user icon can be permitted.

When the Internet user completes the modifications, the user can select the "Save" button 620, to transmit any changes to the content provider 120. If the user is not satisfied with the modifications, the Internet user can select the "Cancel" button 625 to reset the modification medium with the latest saved information.

Figure 8:
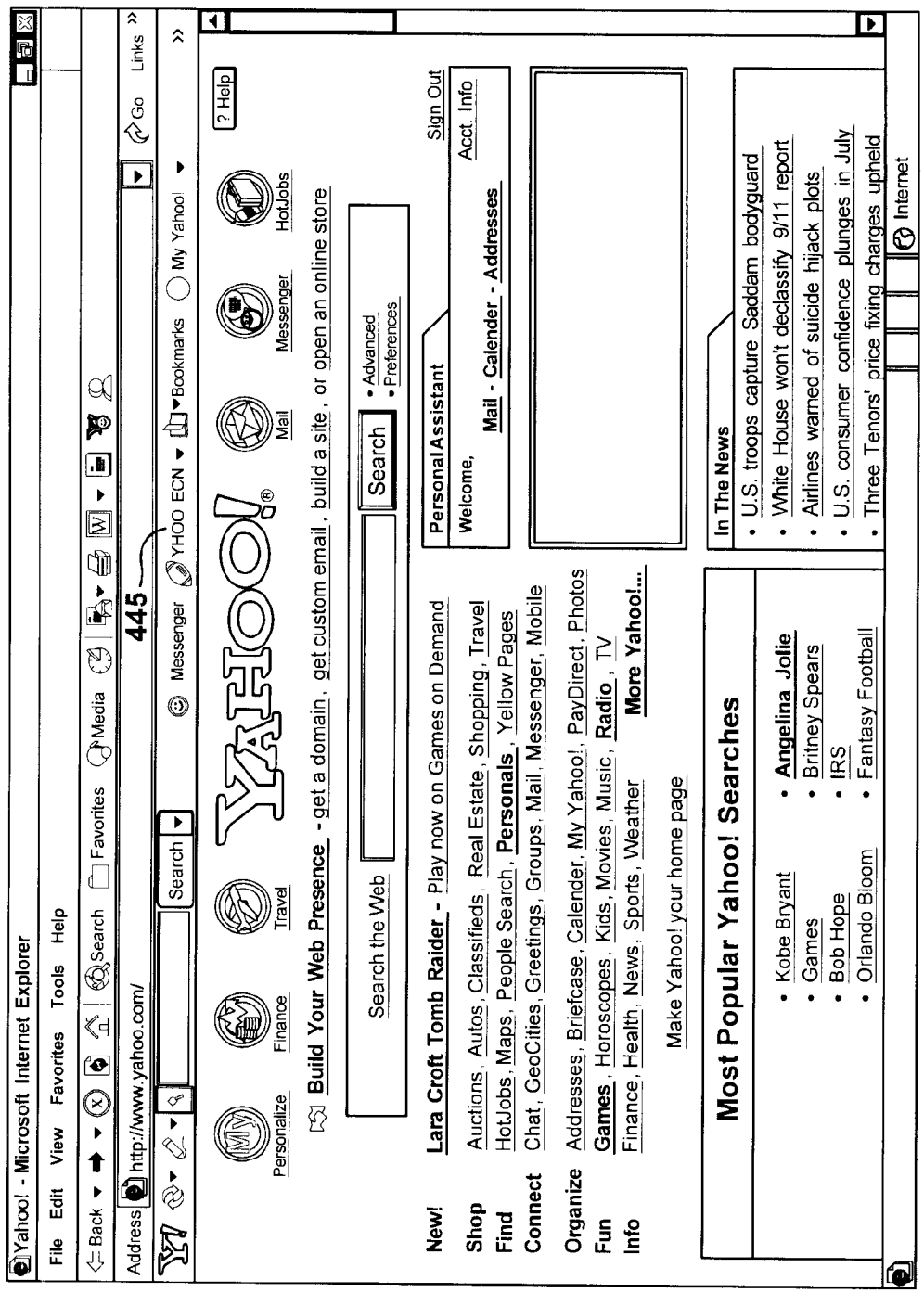
FIG. 8 is an exemplary screen shot illustrating a customizable button according to an embodiment of the invention.

FIG. 8 is a screenshot illustrating the customizable button 445 after the user enters his modifications. Button 445 includes the title "YHOO ECN", and is displayed with a football icon.

Returning to the description of method 300 (FIG. 3), after the server 126 displays the saved location in step 320, processing proceeds from step 320 to step 325. In step 325, the server 126 receives the modifications to the button characteristics, e.g., a title, a URI and an associated icon. These modifications are saved by the content provider 120 with a user's account. The user is thereby permitted to setup customized buttons at a first computer and have access to the same customized buttons at other computers, which have access to the content provider 120, e.g., computers with Internet access. In addition, multiple users who use the same computer can each have their own customized buttons.

After the modifications to the button characteristics are saved at the server 126, processing proceeds from step 325 to step 330. In step 330, the server 126 updates (e.g., refreshes) the customizable button 440 to reflect the modifications made by the user. In an embodiment, the entire toolbar 440 is refreshed. For example, this can be accomplished by creating an invisible instance of the toolbar 440 as an ActiveX control on the webpage, and communicating with that instance via JavaScript to call the Refresh() function on the control. This function will request current toolbar information, e.g., a new feed, from the server 126 which will reflect the modified button information.

Returning to step 310, an Internet user can perform a customizable button modification to change the associated URI to the URI that the user is currently visiting. For example, when an Internet user selects "Use Current URL . . . " 510 (See FIG. 5), server 126 receives a request to modify the customizable button to the current URI and processing proceeds from step 310 to step 335. In step 335, the server 126 directs the client 150 to a modification medium, e.g. a web page, and in step 320, the server 126 displays the current URI associated with the customizable button and the URI of the Internet site the user is currently visiting.

Figure 7:
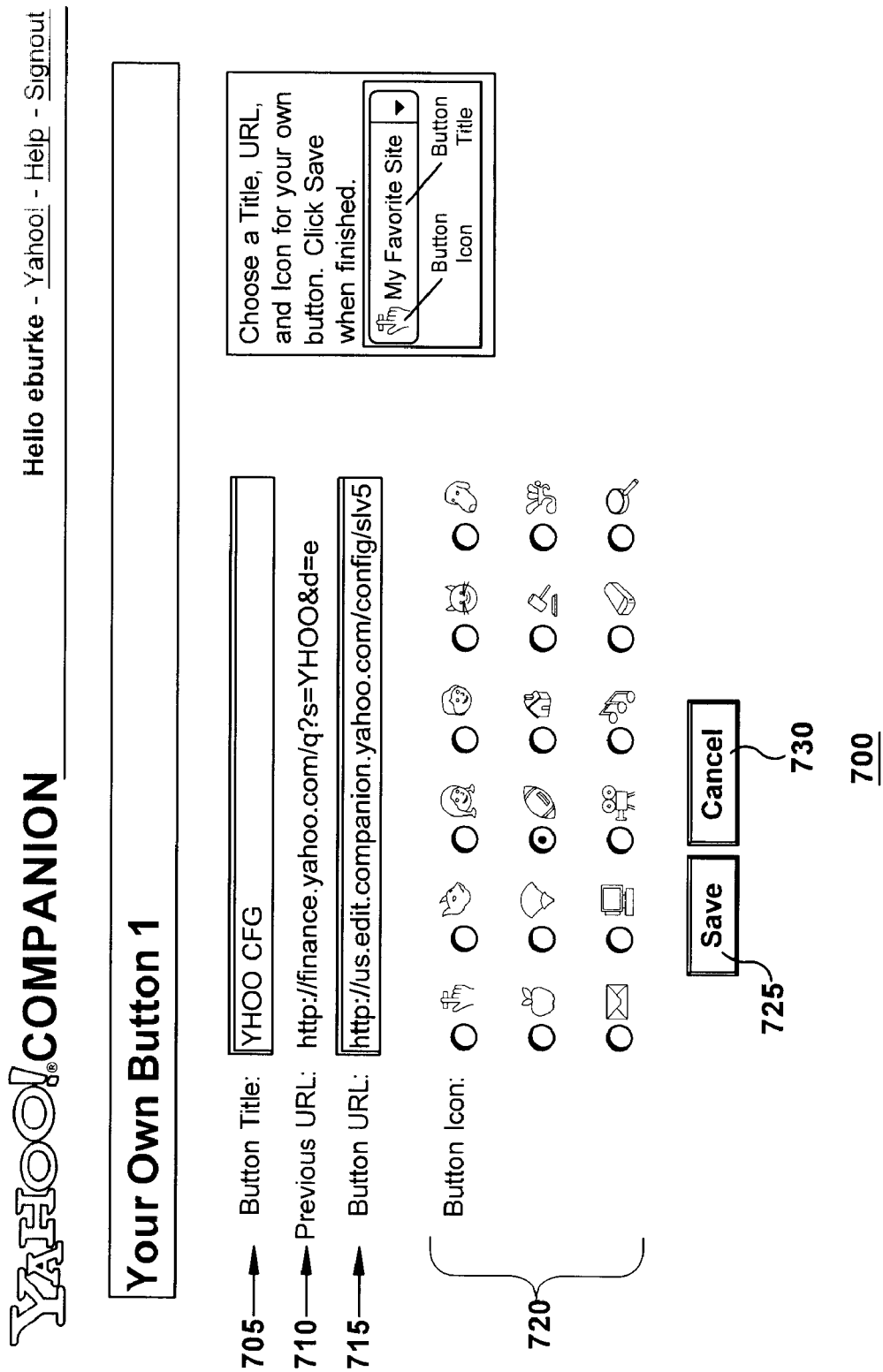
FIG. 7 is an exemplary screen shot illustrating another modification interface according to an embodiment of the invention.

In an embodiment of the invention, a user may be directed to the webpage 700, illustrated in FIG. 7, after selecting "Use Current URL . . . " 510. The webpage 700 includes a customizable button title interface 705, a previous URI indicator 710, a URI associated with the customizable button interface 715, and a plurality of selectable icons 720. The title of the button can be modified by the user by entering a title into interface 705. In the present example the user has decided to name his or her button "YHOO CFG."

In an embodiment, the previous URI 710 is displayed for the user's convenience, but it is not editable. The URI associated with the button can be modified using interface 715. Since the user selected "Use Current URL . . . " 510, the URI of the Internet site that the user was visiting, is automatically entered into interface 715. In this example, the user was visiting "http://us.edit.companion.yahoo.com/config/slv5 . . . ." The icon that will be displayed with the customizable button is selected from a plurality of icons 720. In the present example the user has chosen the football icon.

If the Internet user is satisfied with the URI automatically entered into interface 715, the user can select the "Save" button 725, to transmit changes to the content provider 120. If not satisfied with the URI, the user can make modifications to interface 715 or, the user can select the "Cancel" button 730. This will send the user to the standard modification medium, e.g., webpage 600, loaded with the latest saved information.

Returning to the description of method 300. After the server 126 displays the saved location and the requested location in step 340, processing proceeds from step 340 to step 325 and then to step 330. The descriptions of these steps were made previously and are similarly performed. Method 300 ends after step 330.

While the embodiment above describes customizable buttons for associating a URI with a customizable button, the invention is not limited to this case. In other embodiments, the customizable button may be modified to perform different functions such as opening a new browser application window, etc. Furthermore, the customizable button may be linked to the search box of the downloadable toolbar. For example, a user can modify customizable buttons so that when a user selects a button, a search operation is limited to a certain Internet site, such as, for example, eBay.com. Still in other embodiments, the customizable button may be modified to run scripts, e.g., Javascript. Scripts may be written to perform a plurality of operations including allowing a user to compose and submit an Internet message board entry without having to visit the Internet site hosting the message board, such as, for example, blogger.com.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed:

1. A method comprising:
   receiving, at a server computer, an indication from a client user that the client user desires to configure a user customizable button of a graphical user interface of a browser toolbar of a browser;
   directing, by the server computer, the client user to a configuration medium, the configuration medium comprising a web page that comprises a plurality of client user selectable button options,
   the button options comprising a uniform resource identifier to associate with the user-customizable button, a title to associate with the user-customizable button, and an icon to associate with the user-customizable button,
   the uniform resource identifier associated with the user-customizable button representing a site to which the browser navigates when said client user selects said user customizable button;
   receiving at the server computer a selected button option that configures the user-customizable button of said graphical user interface into a user-customized button; and
   causing, by the server computer, a display of the user-customized button as part of the downloadable toolbar.

2. The method of claim 1, further comprising:
   associating the title and the uniform resource locator associated with the user customizable button with an account of the client user;
   receiving information to enable the client user to log into the account; and
   logging the client user into the account such that the customized button appears in response to logging the client user into the account.

3. The method of claim 2, further comprising transmitting the title and the uniform resource locator to the client user along with non-user-defined button characteristics of buttons for a downloadable toolbar.

4. The method of claim 1, wherein the user-customizable button is part of a downloadable toolbar and provides a function of the downloadable toolbar.

5. The method of claim 1, wherein the uniform resource identifier is associated with a browser extension which, when loaded on a computer of the client user, adds functionality to the browser.

6. The method of claim 1, wherein the user-customizable button is associated with a search field of the downloadable toolbar, the method further comprising:
   causing a search query entered in the search field to be directed to the site associated with the uniform resource identifier for a search to be performed by a search provider at the site.

7. The method of claim 1, further comprising receiving an instruction from the client user to cause the icon to be displayed at least in part within the boundaries of the customized button.

8. The method of claim 1, wherein the user-customizable button defines a first region and a second region, wherein by selecting the first region, the client user initiates a functionality associated with the user-customizable button, and wherein by selecting the second region, the client user initiates a menu including at least one menu item, wherein the at least one menu item is defined at least in part by the title of the user-customizable button of the graphical user interface and the uniform resource locator.

9. The method of claim 8, wherein one of the at least one menu items comprises a button modification option.

10. The method of claim 1, wherein the icon is selected from a plurality of predefined icon choices provided by a user-customizable button provider.

11. The method of claim 1, wherein the icon is an image provided by the client user.

12. A method comprising:
   receiving at a server an indication from a first client user that the first client user desires to configure a first user-customizable button of a first graphical user interface of a first browser toolbar of a first browser;
   receiving at the server an indication from a second client user that the second client user desires to configure a second user-customizable button of a second graphical user interface of a second browser toolbar of a second browser;
   directing the first client user to a configuration medium, the configuration medium comprising a web page that comprises a plurality of first client user selectable button options,
   the first client user selectable button options comprising a uniform resource identifier to associate with the first user-customizable button, a title to associate with the first user-customizable button, and an icon to associate with the first user-customizable button,
   the uniform resource identifier associated with the first user-customizable button representing a site to which the first browser navigates when said first client user selects said first user customizable button;
   directing the second client user to the configuration medium, the configuration medium comprising a web page that comprises a plurality of second client user selectable button options,
   the second client user selectable button options comprising a uniform resource identifier to associate with the second user-customizable button, a title to associate with the second user-customizable button, and an icon to associate with the second user-customizable button;
   the uniform resource identifier associated with the second user-customizable button representing a site to which the second browser navigates when said second client user selects said second user customizable button;
   in response to the first client user utilizing a shared computer, providing by said server the title of said first user-customizable button and said icon of said first user-customizable button to the shared computer to enable the shared computer to display one or more first user-customized buttons for the first client user, resulting in the shared computer having first user-customized buttons for the first graphical user interface of said first browser toolbar customized to the first client user when the shared computer is utilized by the first client user; and in response to the second client user utilizing the shared computer, providing by said server the title of said second user-customizable button and said icon of said second user-customizable button to the shared computer to enable the shared computer to display one or more second user-customized buttons for the second client user, resulting in the shared computer having second user-customized buttons for the second graphical user interface of said second browser toolbar customized to the second client user when the shared computer is utilized by the second client user.

13. The method of claim 12, further comprising:
receiving information to enable the first client user to log into a first client user account; and
logging the first client user into the first client user account such that the providing of the first customized button occurs in response to logging the first client user into the first client user account.

14. The method of claim 13, further comprising:
receiving a request from the second client user to log into a second client user account; and
logging the second client user into the second client user account, wherein the providing of the second customized button occurs in response to logging the second client user into the second client user account.

15. The method of claim 14, further comprising:
logging the first client user out of the first client user account prior to logging the second client user into the second client user account.

16. The method of claim 12, wherein providing the first customized button and providing the second customized button to the computer further comprise providing the first customized button and the second customized button along with non-customized buttons for a downloadable toolbar.

17. The method of claim 12, wherein the user-customizable buttons are part of a downloadable toolbar for adding user-defined functionality to the downloadable toolbar.

18. The method of claim 12, wherein the uniform resource identifier is associated with a browser extension which, when loaded on the shared computer, adds functionality to the browser.

19. The method of claim 12, wherein the browser navigates to the site associated with one of the user-customizable buttons when selected by the first client user.

20. The method of claim 17, wherein one of the user-customizable buttons is associated with a search field of the downloadable toolbar, the method further comprising:
causing a search query entered in the search field to be directed to the site associated with the uniform resource identifier for a search to be performed by a search provider at the site.

21. The method of claim 12, further comprising receiving an instruction from the first client user to cause an icon to be displayed at least in part within the boundaries of one of the customized buttons.

22. The method of claim 12, wherein one of the user-customizable buttons defines a first region and a second region, wherein by selecting the first region, the first client user initiates a functionality associated with the one user-customizable button, and wherein by selecting the second region, the first client user initiates a menu including at least one menu item, wherein the at least one menu item is defined at least in part by the title of the first a user-customizable button of the graphical user interface.

23. The method of claim 22, wherein one of the at least one menu items comprises a button modification option.

24. The method of claim 21, wherein the icon is selected from a plurality of predefined icon choices provided by a user-customizable button provider.

25. The method of claim 21, wherein the icon is an image provided by the first client user.

26. A system comprising:
at least one server configured for:
receiving an indication from a client user that the client user desires to configure a user customizable button of a graphical user interface of a browser toolbar of a browser;
directing the client user to a configuration medium, the configuration medium comprising a web page that comprises a plurality of client user selectable button options, the button options comprising a uniform resource identifier to associate with the user-customizable button, a title to associate with the user-customizable button, and an icon to associate with the user-customizable button,
the uniform resource identifier associated with the user-customizable button representing a site to which the browser navigates when said client user selects said user customizable button;
receiving at said server a selected button option that configures the user-customizable button of said graphical user interface into a user-customized button; and
causing a display of the user-customized button as part of the downloadable toolbar.

27. The system of claim 26, wherein the server is further configured for:
associating the title of the user-customizable button of a graphical user interface with an account of the client user;
associating the uniform resource locator with the account of the user;
receiving information to enable the client user to log into the account; and
logging the client user into the account such that the customized button appears in response to logging the client user into the account.

28. A computer readable storage medium comprising instructions that, when executed by a server computer, causes the server computer to perform a method comprising:
receiving, at said server computer, an indication from a user that the user desires to configure a user customizable button of a graphical user interface of a browser toolbar of a browser;
directing, by the server computer, the client user to a configuration medium, the configuration medium comprising a web page that comprises a plurality of client user selectable button options,
the button options comprising a uniform resource identifier to associate with the user-customizable button, a title to associate with the user-customizable button, and an icon to associate with the user-customizable button,
the uniform resource identifier associated with the user-customizable button representing a site to which the browser navigates when said client user selects said user customizable button;
receiving at said server computer a selected button option that configures the user-customizable button of said graphical user interface into a user customized button; and
causing, by the server computer, a display of a user customized button as part of the downloadable toolbar.

29. The computer readable storage medium of claim 28, wherein the client user has an account with a user-customizable button provider, the method performed by the computer further comprising:

sending information to enable the client user to log into the client user account at the provider; and receiving customized button characteristics from the provider after the client user is logged into the account.

30. The computer readable storage medium of claim 28, wherein the receiving comprises receiving the text for naming a user-customizable button of a graphical user interface along with non-user-defined button characteristics of buttons for a downloadable toolbar.

31. A method comprising:

receiving at a server text from a client user for naming a user-customizable button of a graphical user interface and data identifying a uniform resource locator, said uniform resource locator representing a site to which a browser navigates when said client user selects said user-customizable button;

associating the text for naming said user-customizable button of said graphical user interface and data identifying a uniform resource locator with the user-customizable button;

transmitting from said server user-defined button characteristics comprising said text to the client user so that said user-customizable button appears in said graphical user interface for use with a downloadable toolbar for the browser as a client user customized button;

receiving at said server a button modification request;

directing the client user to a modification medium, the modification medium comprising a modification web page that comprises a plurality of client user selectable button modification options;

wherein the modification options comprise a uniform resource identifier to associate with the user-customizable button, a title to associate with the user-customizable button, and an icon to associate with the user-customizable button;

receiving at said server a selected modification option that modifies the user-customizable button of a graphical user interface into a user-customized button;

causing the display of the user-customized button as part of the downloadable toolbar.

32. A method comprising:

receiving at a server a modification request for modifying a button of a graphical user interface, for use with a downloadable toolbar for a browser, the button being capable of being customized by a client user;

directing by the server the client user to a configuration medium, the configuration medium comprising a configuration web page that comprises a plurality of client user selectable button configuration options, the button configuration options comprising a uniform resource identifier to associate with the button, a title to associate with the button, and an icon to associate with the button;

receiving by the server configuration modification information including data identifying the uniform resource identifier, the uniform resource identifier representing a site to which said browser navigates when said client user selects said user-customized button; and causing display of the user-customized button.

33. The method of claim 32, wherein the modification information comprises information from the user that results in an icon being associated with the button.

34. The method of claim 32, the method further comprising:

determining a particular uniform resource identifier to which the browser has been navigated at times at which said modification request is received; and applying the modification information so as to automatically modify the user-defined button characteristics to associate the button with the particular determined uniform resource identifier.

35. The method of claim 34, wherein the modification is implemented by initiating a modification of the toolbar.

36. The method of claim 34, further comprising displaying at least the uniform resource identifier associated with the button and the particular determined uniform resource identifier prior to modification.

37. The method of claim 12, wherein one of the user-customizable buttons defines a first region and a second region, wherein by selecting the first region, the first user initiates a functionality associated with the one user-customizable button, and wherein by selecting the second region, the first user initiates a menu including at least one menu item, wherein the at least one menu item is defined at least in part by the first data identifying a first uniform resource locator.

* * * * *